(12) United States Patent
Kurpejovic et al.

(10) Patent No.: US 10,815,855 B2
(45) Date of Patent: Oct. 27, 2020

(54) MIXER

(71) Applicant: Eberspächer Exhaust Technology GmbH & Co. KG, Neunkirchen (DE)

(72) Inventors: Enver Kurpejovic, Kirchheim unter Teck (DE); Krishna Kumar Vempati, Esslingen (DE); Vijaya Bhaskar Solipuram, Esslingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 1 day.

(21) Appl. No.: 16/250,555

(22) Filed: Jan. 17, 2019

(65) Prior Publication Data

US 2019/0226379 A1 Jul. 25, 2019

(30) Foreign Application Priority Data

Jan. 22, 2018 (DE) .................. 10 2018 101 253

(51) Int. Cl.
| | |
|---|---|
| *F01N 3/00* | (2006.01) |
| *F01N 3/28* | (2006.01) |
| *F01N 3/20* | (2006.01) |
| *B01D 53/94* | (2006.01) |
| *B01F 3/04* | (2006.01) |
| *B01F 5/04* | (2006.01) |
| *B01F 5/06* | (2006.01) |

(52) U.S. Cl.
CPC ....... *F01N 3/2803* (2013.01); *B01D 53/9431* (2013.01); *B01F 3/04049* (2013.01); *B01F 5/0451* (2013.01); *B01F 5/0463* (2013.01); *B01F 5/0647* (2013.01); *F01N 3/2066* (2013.01); *F01N 3/2892* (2013.01); *F01N 2610/02* (2013.01)

(58) Field of Classification Search
CPC .... F01N 3/2066; F01N 3/2892; F01N 3/2803; B01F 5/0647; B01F 3/04049; B01F 5/0451; B01D 53/9431
USPC ........................................................... 60/295
See application file for complete search history.

(56) References Cited

U.S. PATENT DOCUMENTS

| | | | | |
|---|---|---|---|---|
| 8,033,104 | B2* | 10/2011 | Zhang | F01N 3/36 60/295 |
| 9,248,404 | B2* | 2/2016 | Brunel | B01F 3/04049 |
| 10,436,095 | B2* | 10/2019 | Greber | F01N 3/2892 |
| 2010/0005790 | A1* | 1/2010 | Zhang | F01N 3/36 60/301 |
| 2013/0216442 | A1* | 8/2013 | Brunel | B01F 3/04049 422/172 |

(Continued)

FOREIGN PATENT DOCUMENTS

| | | |
|---|---|---|
| DE | 11 2011 103501 T5 | 11/2013 |
| DE | 10 2016 117900 A1 | 3/2017 |
| DE | 10 2016 104 361 A1 | 9/2017 |

*Primary Examiner* — Jason D Shanske
(74) *Attorney, Agent, or Firm* — McGlew and Tuttle, P.C.

(57) ABSTRACT

A mixer mixes exhaust gas (A) flowing in an exhaust gas-carrying duct of an internal combustion engine with reactant (R) injected into the exhaust gas-carrying duct. The mixer includes a mixer body (26) with a reactant-receiving duct (32) as well as a releasing device (36) with a releasing duct (34). The releasing device adjoins the reactant-receiving duct (32) in a transition area (42) and leads away from the reactant-receiving duct. The releasing device (36) has an asymmetric configuration in relation to a longitudinal axis (LR) of the reactant-receiving duct.

20 Claims, 4 Drawing Sheets

(56) References Cited

U.S. PATENT DOCUMENTS

2015/0110681 A1* 4/2015 Ferront ............... F01N 13/0097
                                                              422/168
2016/0319720 A1* 11/2016 Alano ................... F01N 3/2066
2017/0089246 A1* 3/2017 Greber .................. F01N 3/2892

* cited by examiner

MIXER

CROSS REFERENCE TO RELATED APPLICATIONS

This application claims the benefit of priority under 35 U.S.C. § 119 of German Application 10 2018 101 253.5, filed Jan. 22, 2018, the entire contents of which are incorporated herein by reference.

TECHNICAL FIELD

The present invention pertains to a mixer for mixing exhaust gas flowing in an exhaust gas-carrying duct of an internal combustion engine with reactant injected into the exhaust gas-carrying duct, the mixer comprising a mixer body with a reactant-receiving duct as well as a releasing device, which adjoins the reactant-receiving duct in a transition area and leads away from the reactant-receiving duct, with a releasing duct.

BACKGROUND

Such mixers are known from DE 10 2016 104 361 A1. Two reactant releasing ducts, which lead away from the transition area adjoining the reactant-receiving duct in two essentially opposite directions and form a T-shaped structure symmetrical with a longitudinal axis of the reactant-receiving duct, branch off from said transition area adjoining the reactant-receiving duct in this prior-art mixer.

SUMMARY OF THE INVENTION

An object of the present invention is to provide a mixer, with which improved mixing of reactant and exhaust gas can be achieved.

This object is accomplished according to the present invention by a mixer for mixing exhaust gas flowing in an exhaust gas-carrying duct of an internal combustion engine with reactant injected into the exhaust gas-carrying duct, comprising a mixer body with a reactant-receiving duct as well as a releasing device with a releasing duct, which said releasing device adjoins the reactant-receiving duct in a transition area and leads away from this reactant-receiving duct, wherein the releasing device has an asymmetrical configuration in relation to a longitudinal axis of the reactant-receiving duct.

A flow guiding leading to improved mixing is achieved by the asymmetrical configuration of the ducts carrying the reactant and the exhaust gas in the mixer body especially also in case of the release of a mixture of reactant and exhaust gas from the releasing device into the now adjoining area of an exhaust gas-carrying duct.

Such an asymmetric configuration can be achieved in a simpler manner and also in a manner leading to a compact design by a single releasing duct adjoining the reactant-receiving duct in the transition area.

To support an efficient mixing especially in the transition area between the reactant-receiving duct and the releasing duct adjoining same due to the deflection taking place in this transition area, it is further proposed that the reactant-receiving duct extend essentially linearly along a longitudinal axis of the reactant-receiving duct or/and that the releasing duct extend essentially linearly along the longitudinal axis of the releasing duct.

Further, improved mixing of reactant and exhaust gas can be supported by an angle smaller than 90° and preferably in the range of 30° to 70° being formed between a longitudinal axis of the reactant-receiving duct and a longitudinal axis of the releasing duct. A deflection by more than 90° is thus forced to take place in the transition area, which leads to a comparatively intense swirling and hence to efficient mixing of the exhaust gas with reactant.

To introduce exhaust gas into the mixer body, an exhaust gas inlet opening device may be provided comprising a plurality of exhaust gas inlet openings leading to the reactant-receiving duct or/and to the exhaust gas duct.

To also achieve now an exhaust gas flow in a direction in which reactant is injected into the reactant-receiving duct, the exhaust gas inlet opening device may comprise at least one exhaust gas inlet opening, which is arranged in an upstream end area of the reactant-receiving duct and is elongated in the direction of a longitudinal axis of the reactant-receiving duct.

Provisions may further be made for an efficient mixing of exhaust gas with reactant for the exhaust gas inlet opening device to comprise at least one exhaust gas inlet opening leading to the transition area, or/and for the exhaust gas inlet opening device to comprise at least one exhaust gas inlet opening leading to the releasing duct.

For the discharge of a mixture of reactant and exhaust gas from the mixer body, a discharge opening device may comprise at least one discharge opening leading out of the releasing duct.

A comparatively large portion of the mixture of exhaust gas and reactant can thus be released through a main discharge opening of the discharge opening device, the releasing duct being open in the direction of a longitudinal axis of the releasing duct at a downstream end area of the releasing duct via the main discharge opening.

Further, the discharge opening device may comprise at least one and preferably a plurality of auxiliary discharge openings leading out of the releasing duct in the area in which the releasing duct extends for the discharge of exhaust gas and reactant.

Provisions may be made in a configuration, which can be configured in a simple manner yet allows a complex shape, for the mixer body to comprise an essentially plate-like (plate shaped) first mixer body part and an essentially plate-like (plate shaped) second mixer body part, wherein the reactant-receiving duct and the releasing duct are formed between the first mixer body part and the second mixer body part. The two mixer body parts are preferably configured here as shaped sheet metal parts.

A first bulge area may be formed in the first mixer body part and a second bulge area may be formed in the second mixer body part to provide the flow volumes for the exhaust gas and for the reactant injected into the exhaust gas stream, the first bulge area and the second bulge area essentially defining the reactant-receiving duct. A third bulge area defining the releasing duct may, furthermore, be formed in the second mixer body part.

To bring about a defined flow deflection, on the one hand, and also an efficient mixing of exhaust gas and reactant, on the other hand, in the transition area, it is proposed that the transition area comprise a recess formed between the second bulge area and the third bulge area at the second mixer body part.

To obtain the asymmetric configuration of the different ducts carrying exhaust gas and reactant in the mixer body, provisions may be made in an advantageous embodiment for the first mixer body part and the second mixer body part to have a circumferential contour brought closer to a circular shape in at least some areas and for a longitudinal axis of the reactant-receiving duct and a longitudinal axis of the releasing duct not extending radially in relation to a central area of the circular shape.

The first mixer body part and the second mixer body part may be connected to one another in an outer circumferential area.

The present invention further pertains to an exhaust system for an internal combustion engine, comprising an exhaust gas-carrying duct, a mixer with a configuration according to the present invention and a reactant injection device for injecting reactant into the reactant-receiving duct of the mixer.

The reactant injection device is preferably arranged here such that it extends into the reactant-receiving duct for a defined release of the reactant into the reactant-receiving duct.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
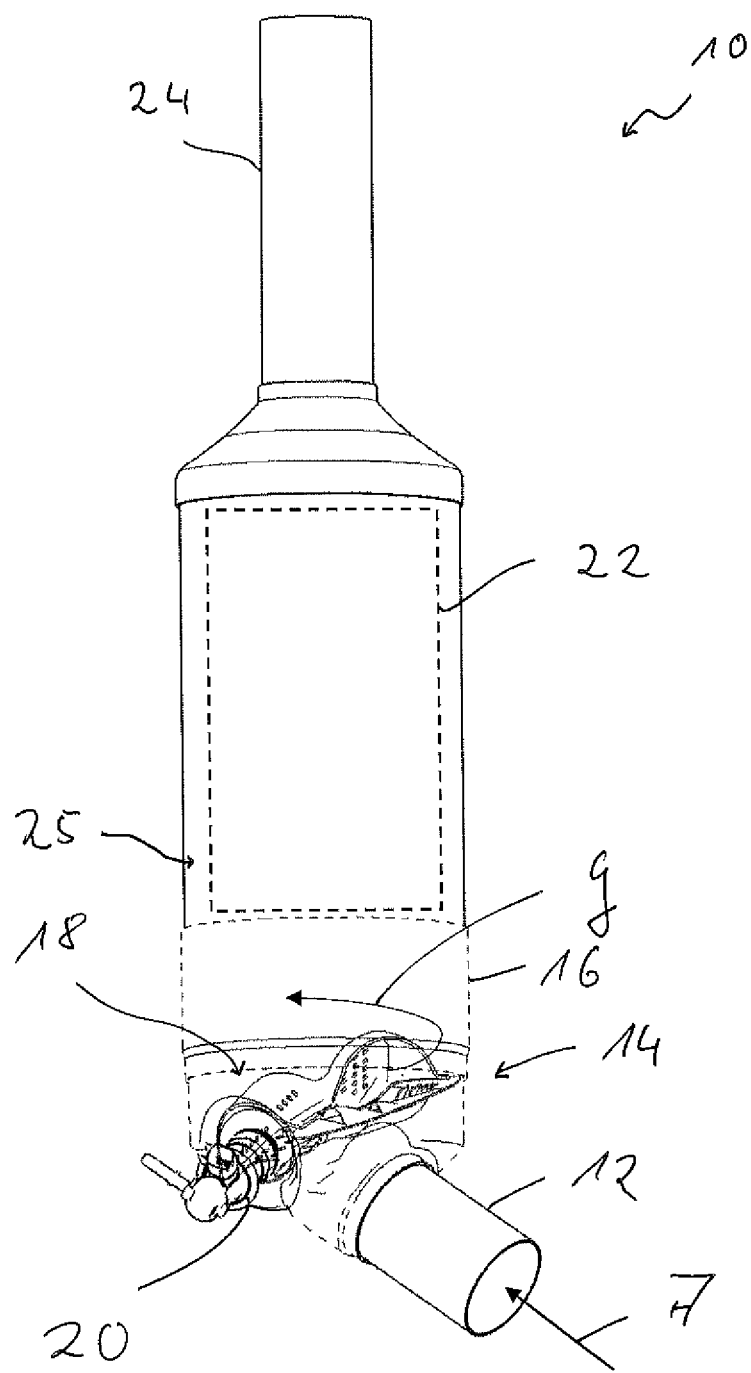
FIG. 1 is a perspective partially transparent view showing a part of an exhaust system of an internal combustion engine with a mixer arranged in an exhaust gas-carrying duct.
Figure 2:
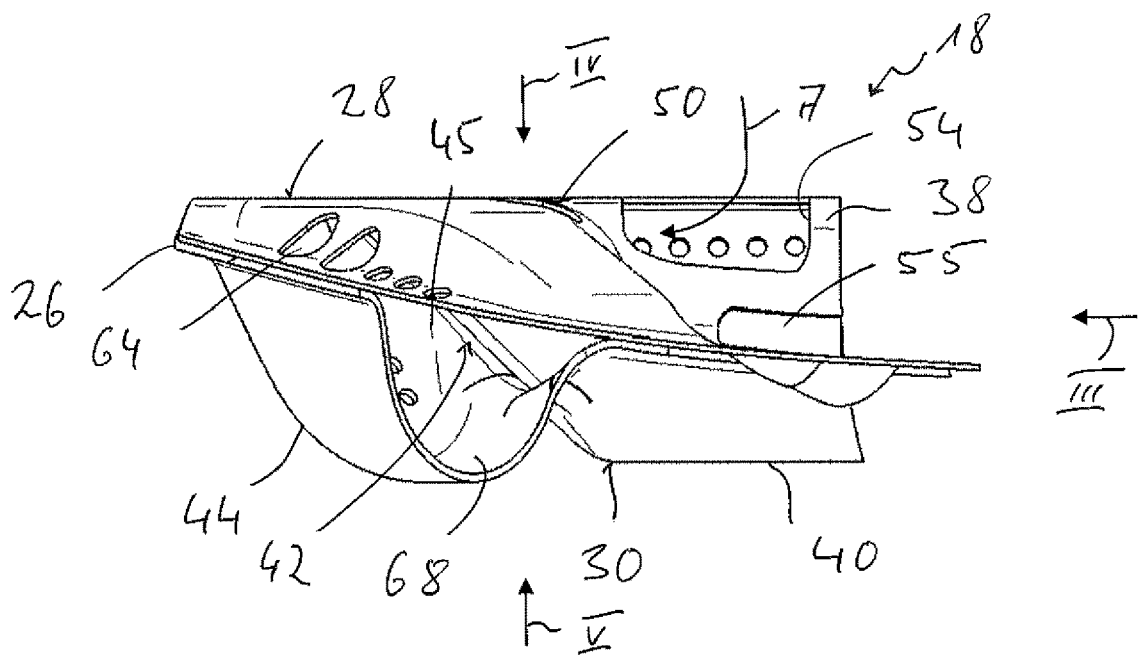
FIG. 2 is a side view of the mixer shown in FIG. 1.
Figure 3:
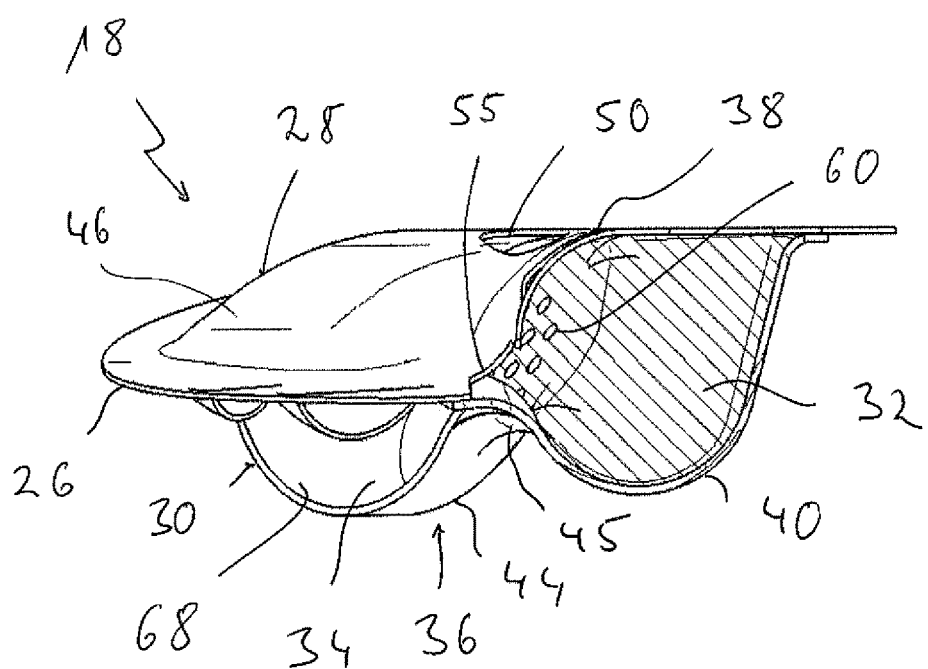
FIG. 3 is a side view of the mixer according to FIG. 1 in viewing direction III in FIG. 2.

Referring to the drawings, FIG. 1 shows a part of an exhaust system of an internal combustion engine, which exhaust system is generally designated by 10. Exhaust gas A is introduced into a mixing section generally designated by 14 via an upstream pipe 12. The mixing section 14 is arranged in a housing generally designated by 16 and comprises a mixer 18, in which reactant is injected via a reactant release device 20, generally called an injector. The mixture G of exhaust gas A and reactant R, which is formed in the mixer, leaves the mixer 18 and enters the interior of the housing 16, in which an exhaust gas treatment device, generally designated by 22, comprising, for example, a catalytic converter device for a selective catalytic reduction as well as a particle filter device, may be provided in an area then following downstream. The treated exhaust gas, with reduced pollutant content, leaves the housing 16 via a downstream pipe 24 and may be discharged into the surrounding area via, for example, one or more muffler devices or additional exhaust gas treatment devices. The pipes 12, 14 and the housing 16 form essentially an exhaust gas-carrying duct 25.

The mixer, which is generally also called tunnel mixer 18, is shown in detail in FIGS. 2 through 5. The mixer 18 comprises a mixer body 26, which is built essentially from two mixer body parts 28, 30 built or formed preferably from sheet metal material. The first mixer body part 28, which is to be positioned such that it is oriented in the upstream direction, and the second mixer body part 30, which is to be positioned such that it is oriented in the downstream direction, define together a reactant-receiving duct 32 and a releasing duct 34 of a releasing device generally designated by 36.

To provide the reactant-receiving duct 32, the first mixer body part 28 having a plate shaped configuration has a first bulge 38. Associated with this, a second bulge 40 is provided at the second mixer body part 30. The two bulges 38, 40 together define the reactant-receiving duct 32, which is elongated in the direction of a longitudinal axis LR of the reactant-receiving duct and extends essentially linearly.

In a transition area generally designated by 42, the reactant-receiving duct 32 passes over into a releasing duct 34 of the releasing device 36. The releasing duct 34 is elongated essentially in the direction of a longitudinal axis LA of the releasing duct and has a configuration extending essentially linearly and leads away from the transition area 42. The releasing duct 34 is defined essentially by a third bulge 44 of the second mixer body part 30 and by a likewise bulge-like area 46 of the first mixer body part 28. The bulge-like area 46 is located opposite said bulge 44. In the transition area 42, the second mixer body part 30 has a recess 45, which recess 45 is formed between the bulges 40, 44 thereof and at which the stream of exhaust gas A and reactant R flowing along the reactant-receiving duct 32 is deflected into the exhaust gas duct 34.

Figure 4:
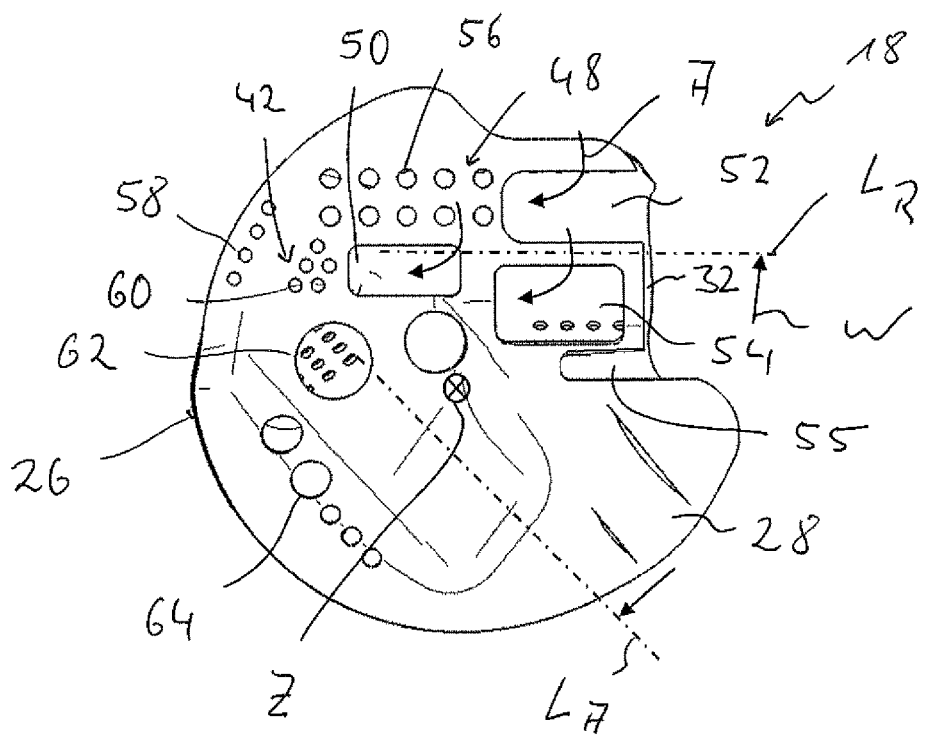
FIG. 4 is a view of the mixer according to FIG. 1 shown in a viewing direction IV in FIG. 2.

FIG. 4 shows that an angle W formed between the reactant-receiving duct 32 and the releasing duct 34, or the longitudinal axes LR and LA thereof, is an acute angle, i.e., an angle smaller than 90°. This means that a comparatively great deflection of the flow of exhaust gas, which leaves the reactant release duct 32 and is already mixed with reactant, is achieved in the transition area 42.

An exhaust gas inlet opening device generally designated by 48 is provided to make possible the entry of exhaust gas A into the volume formed in the mixer body 26, especially the reactant-receiving duct 32. This exhaust gas inlet opening device 48 comprises a plurality of exhaust gas inlet openings 50, 52, 54, 55 elongated in the direction of the longitudinal axis LR of the reactant-receiving duct at the first mixer body part 28 to be positioned upstream, i.e., exposed to the exhaust gas A flowing in. For example, the two exhaust gas inlet openings 52, 54, 55 may be arranged or begin at the upstream end area of the reactant-receiving duct 32, while the exhaust gas inlet opening 50 may be arranged or may end at the downstream end area of the reactant-receiving duct 32. The exhaust gas inlet openings 50, 52, 54, 55 elongated in the longitudinal axis LR of the reactant-receiving duct make possible a deflection of the exhaust gas A introduced into the reactant-receiving duct 32 in the direction of the longitudinal axis R of the reactant-receiving duct or in a direction that also corresponds to a main reactant release direction of the reactant R released from the reactant release device 20 in the reactant-receiving duct 32. It should be noted that the reactant R is released, in general, in the form of a spray cone and the main release direction may correspond, for example, to a central axis of such a spray cone.

The exhaust gas A introduced via the exhaust gas inlet openings 50, 52, 54, 55 flows, together with the reactant R released from the reactant release device 20, in the direction of the transition area 42, so that mixing of exhaust gas A and reactant R may already take place in this flow area. This may be supported by additional exhaust gas inlet openings 56 formed, for example, with a circular cross section in the area of the reactant-receiving duct 32, by correspondingly shaped exhaust gas inlet openings 58, 60 in the transition area 42 and by a plurality of exhaust gas inlet openings 62, 64 provided in the area of the releasing duct 34. Efficient mixing of the exhaust gas A entering different areas with the reactant R is achieved by means of the openings of the exhaust gas inlet opening device 48, which are provided or distributed over the entire flow area in the mixing body 26, and also by the different sizes or shapes of these openings, for providing the mixture G of exhaust gas and reactant, which mixture G leaves the mixer body 26.

A discharge opening device generally designated by 66 is provided to make possible the discharge of the mixture G from the flow volume formed in the mixer body 26. This discharge opening device 66 comprises at the downstream end of the releasing duct 34 a main discharge opening 68, through which a majority of the mixture G flowing in the direction of the longitudinal axis LA of the releasing duct is discharged from the mixer body 26. For example, auxiliary discharge openings 70 are provided in the second mixer body part 30, for example, in the third bulge area 44. Auxiliary discharge openings 72 are likewise provided at the transition area 42. Auxiliary discharge openings 74 of the discharge opening device 66 may also be provided in the area of the reactant-receiving duct 32, for example, in the area of the first bulge 40.

Figure 5:
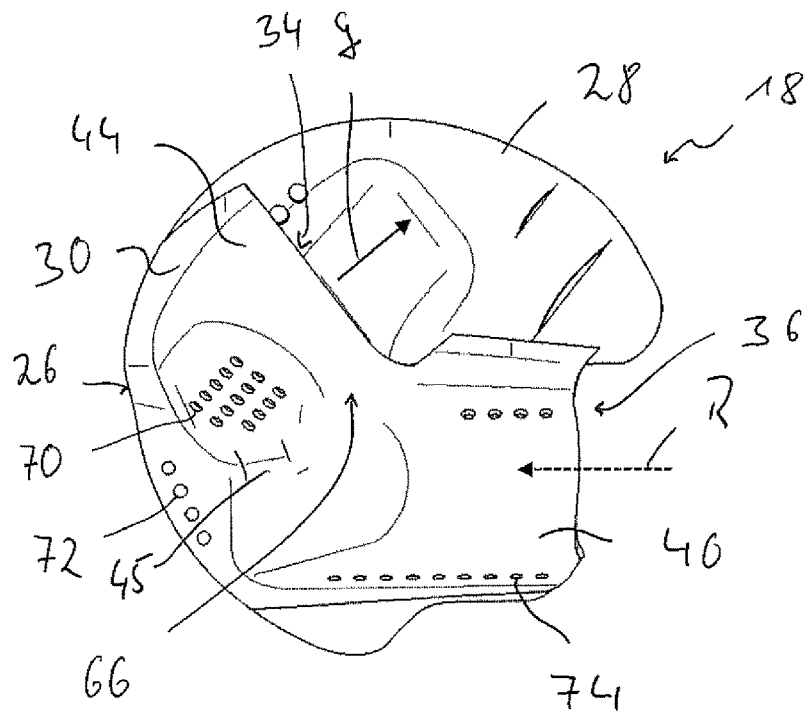
FIG. 5 is a view of the mixer according to FIG. 1 shown in viewing direction V in FIG. 2.
Figure 6:
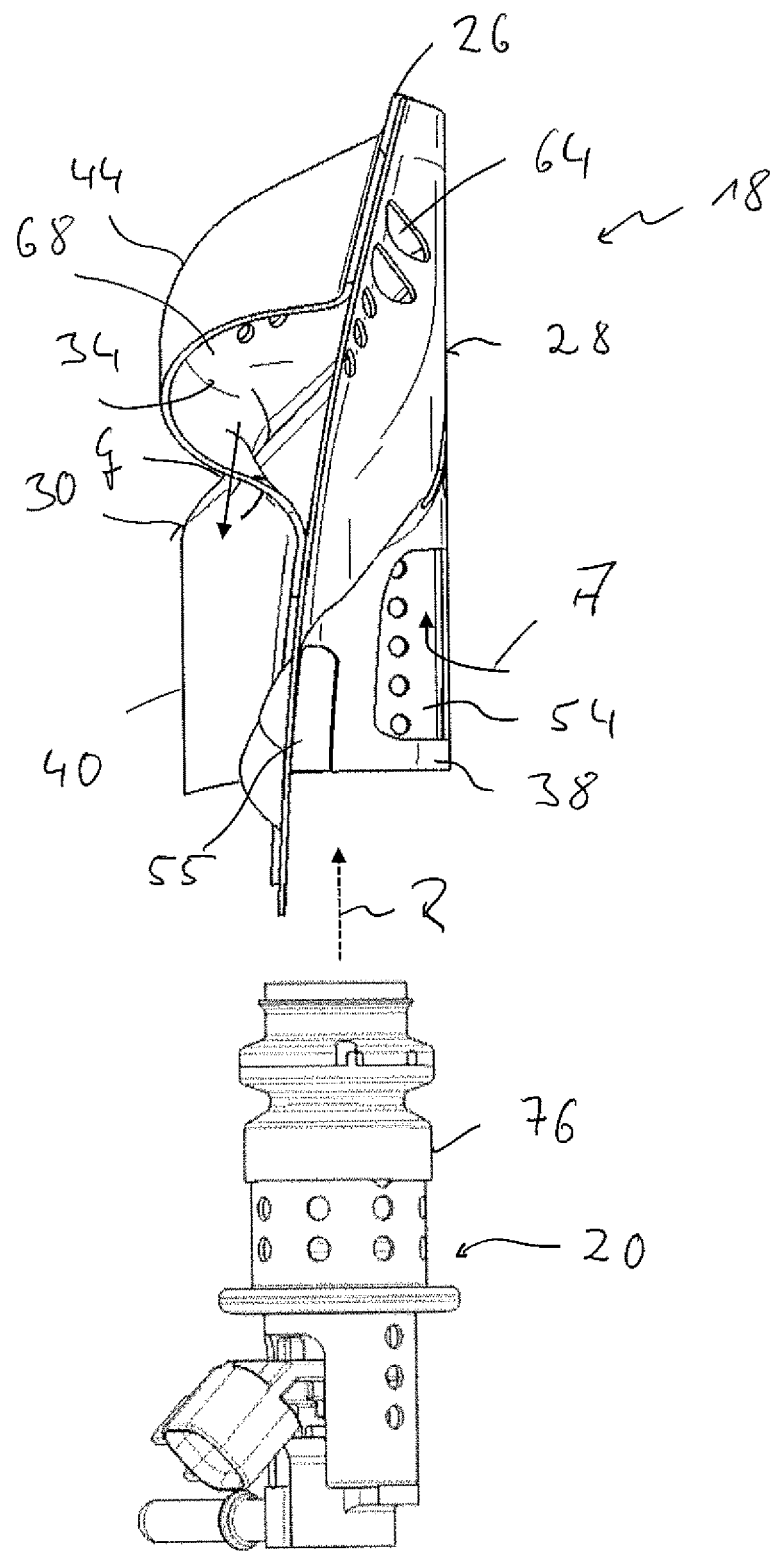
FIG. 6 is a side view of the mixer according to FIG. 1, which side view corresponds to FIG. 2, with a reactant release device positioned to be inserted into the mixer.

It is seen especially in FIGS. 4 and 5 that the mixer body 26 or the two mixer body parts 28, 30 thereof have an approximately circular circumferential contour in large areas in the top view. The reactant-receiving duct 32 and the single exhaust gas duct 34 of the exhaust system 36 are arranged in relation to a fictitious central area Z of this generally circular circumferential contour such that the respective longitudinal axes LR and LA do not extend radially in relation to this central area Z. The two ducts form a generally V-shaped configuration, in which the releasing device 36 with the single releasing duct 34 thereof has only a structure leading away to one side rather than a basically asymmetric structure in relation to the longitudinal axis LR of the reactant-receiving duct 32. The two ducts 32, 34 are thus each eccentric in relation to the central area Z of the mixer body 26, i.e., offset in the direction of the outer edge area of the mixer body 26, so that the portion of the mixture G being discharged especially in the area of the main discharge openings 68 enters the housing 16 in the mixing section 14 in the circular flow suggested in FIG. 1 based on this generally asymmetric, V-shaped arrangement of the ducts 32, 34. This also supports the mixing of the exhaust gas A with the reactant R injected into this exhaust gas A. This flow guiding, which leads to intensified swirling of the mixture flow entering the housing 16, is supported by the different auxiliary discharge openings 70, 72, 74, which are provided in the second mixer body part 30 and whose shape, size and positioning may be selected such as to generate such an efficient mixing of the flow.

It should finally be noted that the two mixer body parts 28, 30 may, of course, also be permanently connected to one another, for example, by welding or soldering, to form a stable structure in their outer circumferential area. The reactant-receiving duct 32 is dimensioned such that it can accommodate the area 76 of the reactant release device 20, which said area is to be inserted into it, so that the release of reactant can take place from a nozzle area of the reactant release device 20 in the interior of the reactant release duct 32. The mixer body 26 may be arranged, in principle, in the housing 16 in the area of the mixing section 14 such that it is arranged in an inclined position in relation to the exhaust gas stream flowing in, on the one hand, and in relation to a central longitudinal axis of the housing 16, on the other hand, in order to support a defined flow guiding and especially also the circular flow discharged from the mixer body 26.

While specific embodiments of the invention have been shown and described in detail to illustrate the application of the principles of the invention, it will be understood that the invention may be embodied otherwise without departing from such principles.

What is claimed is:

1. A mixer for mixing exhaust gas flowing from an exhaust gas-carrying duct of an internal combustion engine with reactant injected into the exhaust gas-carrying duct, the mixer comprising a mixer body, the mixer body comprising a plate shaped first mixer body part and a plate shaped second mixer body part and comprising:
   a reactant-receiving duct having a reactant-receiving duct longitudinal axis and extending linearly along the reactant receiving duct longitudinal axis; and
   a releasing device adjoining the reactant-receiving duct in a transition area, the releasing device leading away from the reactant-receiving duct, the releasing device comprising a releasing duct extending linearly along a releasing duct longitudinal axis, the reactant-receiving duct and the releasing duct being formed between the first mixer body part and the second mixer body part, wherein an angle smaller than 90° is formed between the reactant-receiving duct longitudinal axis and the releasing duct longitudinal axis, wherein the releasing device has an asymmetric configuration in relation to the reactant-receiving duct longitudinal axis.

2. The mixer in accordance with claim 1, wherein:
   the reactant-receiving duct comprises a single releasing duct adjoining the reactant-receiving duct in the transition area.

3. The mixer in accordance with claim 1, further comprising an exhaust gas inlet opening device comprising a plurality of exhaust gas inlet openings leading to the reactant-receiving duct or leading to the releasing duct or leading to the reactant-receiving duct and leading to the releasing duct.

4. The mixer in accordance with claim 3, wherein the exhaust gas inlet opening device comprises at least one exhaust gas inlet opening arranged in an upstream end area of the reactant-receiving duct, the at least one exhaust gas inlet opening being elongated in the direction of the reactant-receiving duct longitudinal axis.

5. The mixer in accordance with claim 3, wherein the exhaust gas inlet opening device comprises at least one exhaust gas inlet opening leading to the transition area.

6. The mixer in accordance with claim 1, further comprising a discharge opening device comprising at least one discharge opening leading out of the releasing duct.

7. The mixer in accordance with claim 6, wherein:
   the discharge opening device comprises a main discharge opening; and
   the releasing duct is open in a direction of a releasing duct longitudinal axis via the main discharge opening, at a downstream end area of the releasing duct.

8. The mixer in accordance with claim 7, wherein the discharge opening device comprises at least one auxiliary discharge opening leading out of the releasing duct in an area in which the releasing duct extends.

9. The mixer in accordance with claim 1, wherein:
a first bulge area is formed in the first mixer body part; and
a second bulge area is formed in the second mixer body part;
the first bulge area and the second bulge area define the reactant-receiving duct; and
a third bulge area defining the releasing duct is formed in the second mixer body part;
the transition area comprises a recess formed on the second mixer body part between the second bulge area and the third bulge area.

10. The mixer in accordance with claim 1, wherein the first mixer body part and the second mixer body part have a circumferential contour, configured closer to a circular shape in at least some areas and wherein:
the reactant-receiving duct longitudinal axis and a releasing duct longitudinal axis do not extend radially in relation to a central area of the circular shape; or
the first mixer body part and the second mixer body part are connected to one another in an outer circumferential area; or
the reactant-receiving duct longitudinal axis and a releasing duct longitudinal axis do not extend radially in relation to a central area of the circular shape and the first mixer body part and the second mixer body part are connected to one another in an outer circumferential area.

11. An exhaust system for an internal combustion engine, the exhaust system comprising:
an exhaust gas-carrying duct;
a mixer comprising a mixer body, the mixer body comprising a plate shaped first mixer body part and a plate shaped second mixer body part and comprising:
a reactant-receiving duct having a reactant-receiving duct longitudinal axis and extending linearly along the reactant receiving duct longitudinal axis; and
a releasing device adjoining the reactant-receiving duct in a transition area, the releasing device leading away from the reactant-receiving duct, the releasing device comprising a releasing duct extending linearly along a releasing duct longitudinal axis, the reactant-receiving duct and the releasing duct being formed between the first mixer body part and the second mixer body part, wherein an angle smaller than 90° is formed between the reactant-receiving duct longitudinal axis and the releasing duct longitudinal axis, wherein the releasing device has an asymmetric configuration in relation to the reactant-receiving duct longitudinal axis; and
a reactant injection device for injecting reactant into the reactant-receiving duct of the mixer.

12. The exhaust system in accordance with claim 11, wherein the reactant injection device is arranged such that the reactant injection device extends into the reactant-receiving duct.

13. The exhaust system in accordance with claim 11, wherein:
the reactant-receiving duct comprises a single releasing duct adjoining the reactant-receiving duct in the transition area.

14. The exhaust system in accordance with claim 11, further comprising an exhaust gas inlet opening device comprising a plurality of exhaust gas inlet openings leading to the reactant-receiving duct or leading to the releasing duct or leading to the reactant-receiving duct and leading to the releasing duct.

15. The exhaust system in accordance with claim 14, wherein:
the exhaust gas inlet opening device comprises at least one exhaust gas inlet opening arranged in an upstream end area of the reactant-receiving duct, the at least one exhaust gas inlet opening being elongated in the direction of the reactant-receiving duct longitudinal axis.

16. The exhaust system in accordance with claim 14, further comprising a discharge opening device comprising at least one discharge opening leading out of the releasing duct.

17. The exhaust system in accordance with claim 16, wherein:
the discharge opening device comprises a main discharge opening; and
the releasing duct is open in a direction of a releasing duct longitudinal axis via the main discharge opening, at a downstream end area of the releasing duct.

18. The exhaust system in accordance with claim 17, wherein the discharge opening device comprises at least one auxiliary discharge opening leading out of the releasing duct in an area in which the releasing duct extends.

19. The exhaust system in accordance with claim 11, wherein:
a first bulge area is formed in the first mixer body part; and
a second bulge area is formed in the second mixer body part;
the first bulge area and the second bulge area essentially define the reactant-receiving duct; and
a third bulge area defining the releasing duct is formed in the second mixer body part;
the transition area comprises a recess formed on the second mixer body part between the second bulge area and the third bulge area.

20. A mixer for mixing exhaust gas flowing from an exhaust gas-carrying duct of an internal combustion engine with reactant injected into the exhaust gas-carrying duct, the mixer comprising:
a mixer body comprising a first mixer body plate part and a second mixer body plate part, the first mixer body plate part and the second mixer body plate part defining a reactant-receiving duct, a reactant-receiving opening, a transition area and a releasing device having a releasing opening and a releasing duct, the reactant-receiving duct having a reactant-receiving duct longitudinal axis, the releasing duct having a releasing duct longitudinal axis, the reactant-receiving duct extending linearly along the reactant-receiving duct longitudinal axis from the reactant-receiving opening to the transition area, the releasing duct extending linearly along the releasing duct longitudinal axis from the transition area to the releasing opening, wherein an acute angle is formed between the reactant-receiving duct longitudinal axis and the releasing duct longitudinal axis, wherein the releasing device has an asymmetric configuration in relation to the reactant-receiving duct longitudinal axis.

\* \* \* \* \*